US007431649B2

(12) United States Patent
Webb et al.

(10) Patent No.: US 7,431,649 B2
(45) Date of Patent: Oct. 7, 2008

(54) GAMING DEVICE HAVING A WHEEL WITH MULTIPLE INDICATORS

(75) Inventors: Bayard S. Webb, Sparks, NV (US); John D. Hostetler, Reno, NV (US); Kimberley K. Karstens, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 893 days.

(21) Appl. No.: 10/243,459

(22) Filed: Sep. 12, 2002

(65) Prior Publication Data

US 2004/0053660 A1 Mar. 18, 2004

(51) Int. Cl.
*A63F 13/00* (2006.01)
*A63F 9/24* (2006.01)
*G06F 17/00* (2006.01)
*G06F 19/00* (2006.01)

(52) U.S. Cl. ............................ 463/25; 463/16; 463/20; 463/29; 273/138.1; 273/143 R

(58) Field of Classification Search ............ 463/16–20, 463/25, 29; 273/138.1, 143 R
See application file for complete search history.

(56) References Cited

U.S. PATENT DOCUMENTS 4,560,161 A 12/1985 Hamano
5,205,555 A 4/1993 Hamano
5,584,763 A * 12/1996 Kelly et al. .................. 463/16
5,788,573 A 8/1998 Baerlocher et al.
5,823,874 A 10/1998 Adams
5,848,932 A 12/1998 Adams
5,882,261 A 3/1999 Adams
5,911,418 A 6/1999 Adams
5,947,820 A 9/1999 Morro et al.
6,015,346 A 1/2000 Bennett
6,059,658 A 5/2000 Mangano et al.
6,089,978 A 7/2000 Adams
6,142,873 A 11/2000 Weiss et al.
6,159,095 A 12/2000 Frohm et al.

(Continued)

FOREIGN PATENT DOCUMENTS

DE 8710757 11/1987

(Continued)

OTHER PUBLICATIONS

Monte Carlo Advertisement written by Bally Gaming, published prior to Sep. 12, 2002.

(Continued)

*Primary Examiner*—Robert E Pezzuto
*Assistant Examiner*—Milap Shah
(74) *Attorney, Agent, or Firm*—Bell, Boyd & Lloyd LLP

(57) ABSTRACT

A wagering game including a wheel and multiple section indicators. The wheel includes a plurality of sections having awards associated with each of the sections. The section indicators associated with the wheel simultaneously indicate sections on the wheel. The awards associated with the sections indicated by the activated section indicators are summed and provided to a player. The number of activated section indicators is predetermined, randomly determined, determined by the player's wager in the primary or base game, determined in a primary game or determined by a sub-game or a set.

30 Claims, 11 Drawing Sheets

U.S. PATENT DOCUMENTS

| | | | | |
|---|---|---|---|---|
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,190,255 | B1 | 2/2001 | Thomas et al. | |
| 6,200,217 | B1 | 3/2001 | Osawa | |
| 6,224,483 | B1 | 5/2001 | Mayeroff | |
| 6,231,442 | B1 | 5/2001 | Mayeroff | |
| 6,234,897 | B1 | 5/2001 | Frohm et al. | |
| 6,261,177 | B1 | 7/2001 | Bennett | |
| 6,309,300 | B1 | 10/2001 | Glavich | |
| 6,315,664 | B1 | 11/2001 | Baerlocher et al. | |
| 6,319,123 | B1 | 11/2001 | Paludi | |
| 6,334,814 | B1 | 1/2002 | Adams | |
| 6,336,863 | B1 | 1/2002 | Baerlocher et al. | |
| 6,346,043 | B1 | 2/2002 | Colin et al. | |
| 6,347,996 | B1 | 2/2002 | Gilmore et al. | |
| 6,364,766 | B1 | 4/2002 | Anderson et al. | |
| 6,364,767 | B1 | 4/2002 | Brossard et al. | |
| 6,375,187 | B1 | 4/2002 | Baerlocher et al. | |
| 6,416,409 | B1 * | 7/2002 | Jordan | 463/27 |
| 6,439,995 | B1 | 8/2002 | Hughs-Baird et al. | |
| 6,443,837 | B1 | 9/2002 | Jaffe et al. | |
| 6,464,582 | B1 | 10/2002 | Baerlocher et al. | |
| 6,508,707 | B2 | 1/2003 | DeMar et al. | |
| D473,270 | S * | 4/2003 | Seelig et al. | D21/385 |
| 6,561,904 | B2 | 5/2003 | Locke et al. | |
| 6,582,307 | B2 | 6/2003 | Webb | |
| 6,599,185 | B1 | 7/2003 | Kaminkow et al. | |
| 6,602,135 | B1 | 8/2003 | Gerrard | |
| 6,602,137 | B2 | 8/2003 | Kaminkow et al. | |
| 6,607,437 | B2 | 8/2003 | Casey et al. | |
| 7,175,523 | B2 * | 2/2007 | Gilmore et al. | 463/16 |
| 2002/0004424 | A1 | 1/2002 | Nelson et al. | |
| 2002/0025846 | A1 | 2/2002 | Bennett et al. | |
| 2002/0025849 | A1 | 2/2002 | Olive | |
| 2002/0042294 | A1 * | 4/2002 | Pau et al. | 463/16 |
| 2002/0187827 | A1 * | 12/2002 | Blankstein | 463/20 |
| 2004/0002372 | A1 | 1/2004 | Rodgers et al. | |

FOREIGN PATENT DOCUMENTS

| | | |
|---|---|---|
| DE | 19600787 | 5/1997 |
| DE | 19613455 | 8/1997 |
| DE | 19936196 | 1/2001 |
| GB | 2 201 821 | 9/1988 |
| GB | 2322217 | 8/1998 |

OTHER PUBLICATIONS

Wheel & Deal Brochure written by Anchor Games, Strictly Slots, published in Dec. 2001.

Wheel Poker Brochure written by Anchor Games/Bally Gaming, Strictly Slots, published prior to Sep. 12, 2002.

Slot Machines written by Marshal Fey, published 1997.

Wheel of Fortune Advertisement written by IGT, published in 1998.

Wheel of Fortune Advertisement written by IGT, published in 1999.

"American Bandstand Article" in Slot City Times published 2001.

* cited by examiner

GAMING DEVICE HAVING A WHEEL WITH MULTIPLE INDICATORS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to a gaming device having a wheel with multiple indicators.

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporarily stalls or halts the base game play and enables a player to enter a second, different game, which is the secondary or bonus game. The player plays the bonus game, likely receives an award, and returns to the base game.

Bonus games exist that employ a wheel including several awards. A player spins the wheel to obtain one or more awards on the wheel. One such bonus game is the "WHEEL OF FORTUNE" gaming device manufactured by the assignee of this application. In this game, a multi-colored award wheel is attached to a gaming device. The award wheel is divided into several sections. Each section includes an award that ranges in value from twenty-five to one thousand. In this game, a player plays a base game that includes spinning reels and a central payline. When the wheel symbol is positioned along the central payline on the third reel, the player enters the bonus game.

In the bonus game, the player obtains one opportunity or spin of the award wheel. The player spins the award wheel by pressing a button on the gaming device. Once the award wheel starts spinning, the player waits until it stops. An indicator located at the top of the award wheel points to a section of the wheel. The player receives the award on the indicated section for the bonus game. After the player receives that award, the bonus game ends and the player may resume playing the base game.

Another bonus game is disclosed in U.S. Pat. No. 6,224,483. U.S. Pat. No. 6,224,483 discloses a gaming device having a bonus game that initially displays a primary game including several reels with symbols to a player. Multiple paylines are associated with the reels. A bonus game is initiated when the player obtains a specific combination of symbols on the reels. In the bonus game, the player spins a wheel including several awards. The number of spins of the wheel provided to the player is based on the number of paylines that the player played in the primary game, the number of credits wagered on the paylines or a specific symbol combination or combinations on the reels in the primary game. The player spins the wheel in the bonus game and obtains a single award between twenty-five and one thousand credits in each spin.

The bonus game ends when the player has no spins remaining. The player receives the total accumulated award from the bonus game.

Gaming devices that increase the opportunities to obtain awards and increase the size of the awards are desirable. Players are attracted to games that provide several larger awards and the opportunity to obtain a very large award. Therefore, to increase player enjoyment and excitement, it is desirable to provide new games for gaming devices.

SUMMARY OF THE INVENTION

The present invention is directed to a gaming device having a game with an award indicator and specifically, a wheel with multiple section indicators. In one embodiment of the gaming device, the award indicator or wheel has a plurality of sections. Each section includes an award symbol which is associated with one or more awards. Also, the gaming device includes a plurality of activatable section indicators which are adapted to indicate sections on the wheel. In one embodiment, the wheel is a mechanical wheel that is attached to the gaming device and the processor of the gaming device causes the wheel to physically spin. In another embodiment, the wheel is in a video format on a video display device of the gaming device. In one embodiment of a game, a player receives only one spin of the wheel. The player spins the wheel (by activating an input) and receives the awards associated with the sections on the wheel which are simultaneously indicated by the activated section indicators. A total award display indicates the total award obtained by the player in the game.

In one embodiment, the number of activated section indicators is determined by the player's wager in the base game. In another embodiment, the number of activated section indicators is determined by picking one or more selections from a plurality of selections. Thus, in a game having three section indicators, a number one, a number two and a number three are associated with the selections. The player picks one of the selections provided by the gaming device from the plurality of selections to determine the number of section indicators that will be activated in the game. For example, if the player picks one selection and that selection reveals the number three, the gaming device activates all three section indicators in the game and thereby simultaneously indicates three awards on the award wheel.

In another embodiment, a plurality of selections are displayed to the player when the game is initiated. The player picks one of the selections to obtain a number of activated section indicators in the game. In one aspect of this embodiment, the player picks selections having either a zero or a one associated with each of the selections. After the player picks a selection, a zero or a one is revealed to the player. If a one is revealed, the gaming device activates one section indicator in the game. If a zero is revealed, the gaming device does not activate one of the section indicators in the game. The player continues to pick selections until there are no picks remaining. The numbers associated with the picked selections are combined or added together to determine the number of activated section indicators for the game. It should be appreciated that the player is preferably not able to obtain a number of activated section indicators in the game that exceeds the maximum number of section indicators in the game unless the game includes multiple spins of the wheel.

In another embodiment, the number of section indicators is determined in a sub-game. One such embodiment of the sub-game includes a plurality of selections and at least one set such as a sequence associated with each section indicator, which are displayed to the player. The selections include symbols that match symbols in each of the sets or sequences. In addition, the selections include section indicator symbols which activate one or more of the section indicators in the game. In one embodiment, the symbols in the sequences are letters and form a word or words such as a phrase. The player picks selections to obtain the letters in each of the sequences. In one embodiment, at least one of the symbols or letters in the sequences in the game include an additional award such as a number of free activations or spins. It should be appreciated that the additional award may be credits, values, bonus awards or any other suitable award.

If a player completes the sequence (i.e., word or phrase) associated with one or more of the section indicators, the gaming device activates that section indicator or section indicators in the game. In one embodiment, the sequences include at least one common symbol where a single pick by a player completes one or more of the sequences in the game. In this embodiment, the gaming device activates one, a plurality or all of the section indicators in the game based on the picks by the player.

The section indicators may also be activated by picking one of the selections including one or more of the corresponding section indicator symbols. In a further embodiment, a multiplier is associated with each sequence. The multipliers begin the sub-game at a predetermined level such as "1×." The multipliers increase by a predetermined or random amount for each revealed symbol in the sequences associated with the multipliers. The player continues to pick selections from a plurality of selections until the player picks one or more of the section indicator symbols, completely reveals all of the symbols in one or more of the sequences or runs out of picks. If the player revealed all of the symbols in one or more of the sequences or the player picked one or more of the section indicator symbols, the gaming device activates those section indicators in the game.

In one such game, the player receives a number of spins or activations of the wheel. The gaming device causes the wheel to spin and the activated section indicators indicate sections on the wheel. The player obtains a cumulative award which equals the awards indicated by each of the activated section indicators multiplied by the multiplier associated with the activated section indicators. The multiplied awards are summed together and provided to the player as the total award for the game. The player continues to spin the wheel and obtain awards until the player does not have any spins remaining. The game ends and the player obtains the total award indicated in the total award display.

In a further embodiment, the present invention is employed in a primary game. In one such embodiment, the primary game includes a plurality of reels. The reels include a plurality of symbols and section indicator symbols which represent a number of activated section indicators in a bonus game. The processor of the gaming device causes the reels to spin, and activates the section indicators in the bonus game according to the number of section indicator symbols that appear on the reels. The section indicator symbols may indicate specific section indicators to activate in the bonus game or indicate the total number of section indicators to activate in the bonus game. In another embodiment, the section indicator symbols on the reels include a number which corresponds to a number of activated section indicators. The player spins the reels and attempts to obtain one or more of the section indicator symbols located on the reels. The gaming device activates the number of section indicators corresponding to the largest number on the section indicator symbols. In a further embodiment, the primary game includes a plurality of selections as described above. The player picks the selections to activate one or more section indicators in the bonus game. In another embodiment, a specific combination of symbols on the reels is associated with the section indicators in a game. The gaming device spins the reels and activates any of the section indicators based on the specific combinations of symbols indicated on the reels.

In another embodiment, the section indicators each include a different color or colors. The gaming device displays a plurality of reels including a plurality of activator symbols, each of the activator symbols including one of the colors associated with each of the section indicators. The gaming device or player spins the reels and the gaming device activates one or more of the section indicators based on the activator symbol or symbols that occur on the reels. For example, if a blue activator symbol is indicated on the reels, the gaming device activates the section indicator including the color blue.

In a further embodiment, each of the reels includes a color corresponding to a color associated with the section indicators. Each of the reels also includes at least one activator symbol. The gaming device or player activates the reels to indicate one or more symbols on the reels. Then, the gaming device activates the section indicators based on which reels the activator symbols are indicated on in the game. For example, a game includes three reels, a blue reel, a red reel and a yellow reel, which respectively correspond to a blue, red and yellow section indicator in the game. The blue section indicator is activated when at least one activator symbol is indicated on the blue reel. The red section indicator is activated when at least one activator symbol is indicated on the red reel. The yellow section indicator is activated when at least one activator symbol is indicated on the yellow reel. It should be appreciated that the symbols and or reels may include one or more colors or one or more combinations of colors.

In another embodiment, at least one puzzle is associated with the section indicators in a game. In this embodiment, the gaming device activates the section indicator or indicators associated with the puzzle or puzzle completed by the player in the game. In another embodiment, the gaming device displays a single puzzle having multiple components to the player. One or more of the components are associated with the section indicators. Therefore, the gaming device activates the sections indicators based on which components and/or the number of components of the puzzle completed by the player in the game. It should be appreciated that any number of components and/or puzzles may be employed in a game.

In a further embodiment, one or more puzzles such as the sequences described above are employed in a persistence game. In this type of game, the player picks symbols such as letters in one or more of the sequences. The picked symbols remain revealed for a designated number of games. Thus, one player may complete one or more of the sequences during the designated number of games. Additionally, one player may pick and reveal symbols in one or more of the sequences in one game and a subsequent player or players may complete the sequence or sequences in a subsequent game or games.

It is therefore an advantage of the present invention to provide a gaming device having an award wheel with multiple section indicators that provides more awards to players.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
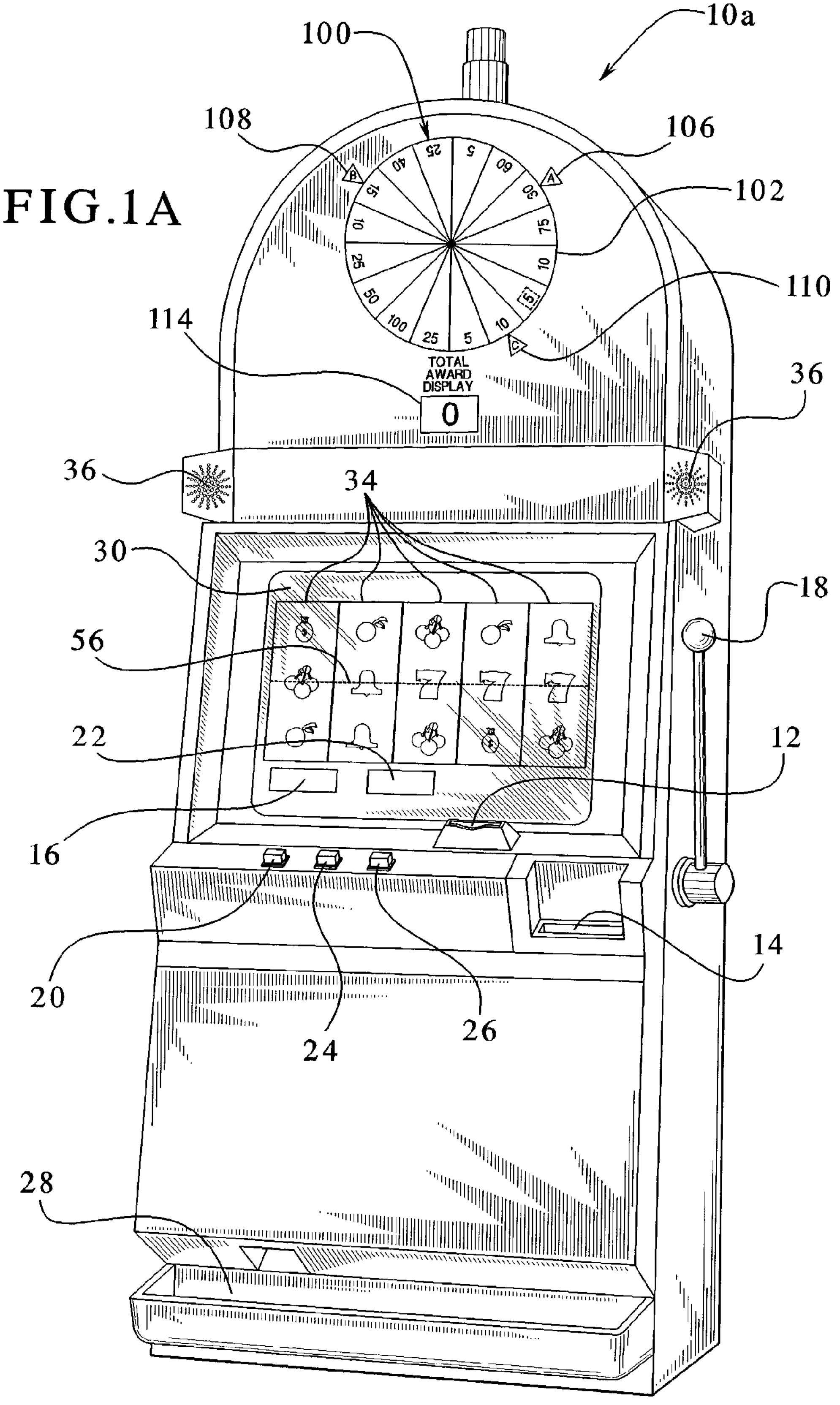
FIG. 1A is a front perspective view of one embodiment of the gaming device of the present invention.
Figure 1B:
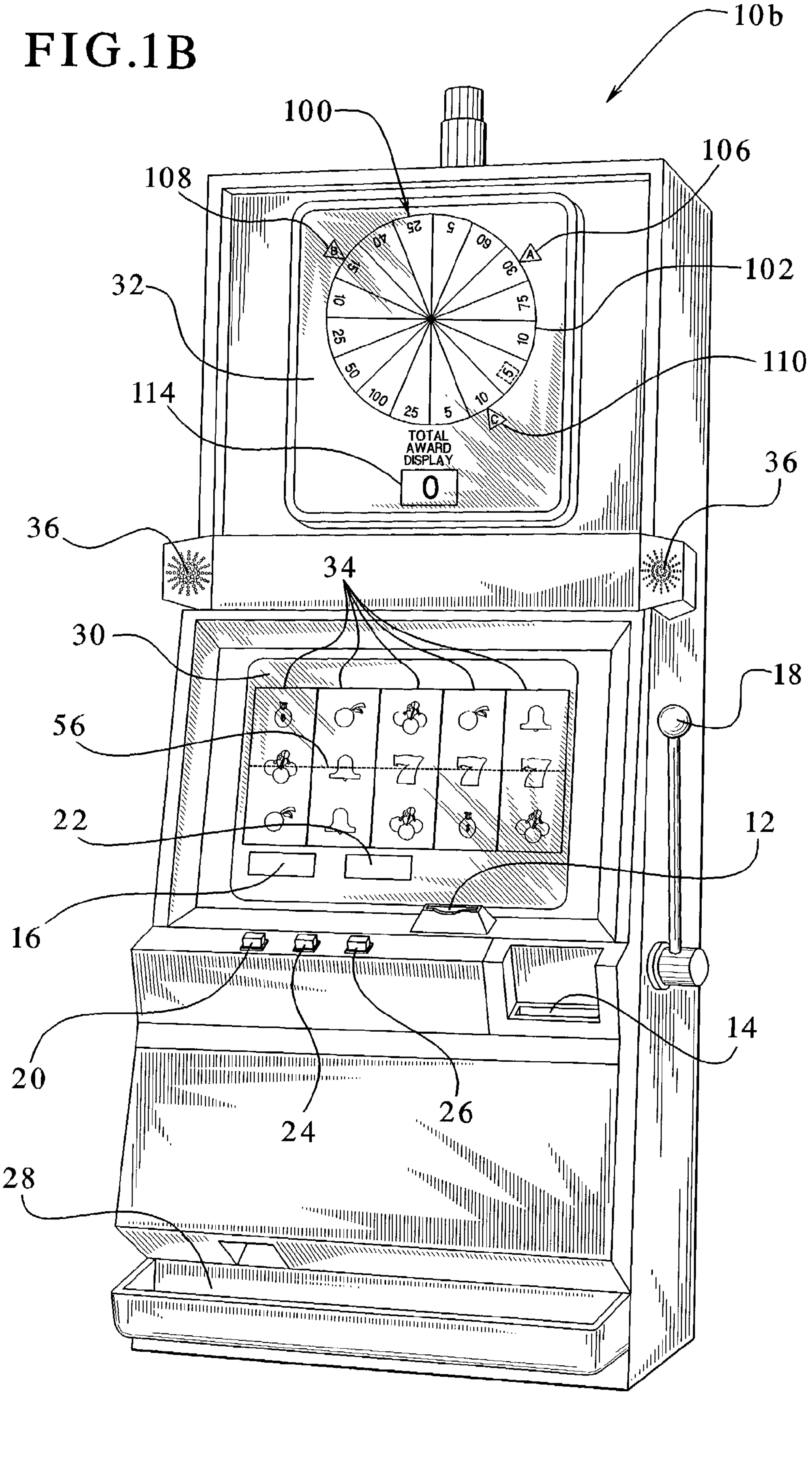
FIG. 1B is a front perspective of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 17 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30 and a mechanical wheel 100, and the alternative embodiment shown in FIG. 1B includes a central display device 30 as well as an upper display device 32 which displays a video image of the wheel 100 to a player. Gaming device 10 in one embodiment displays a plurality of reels 34 such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
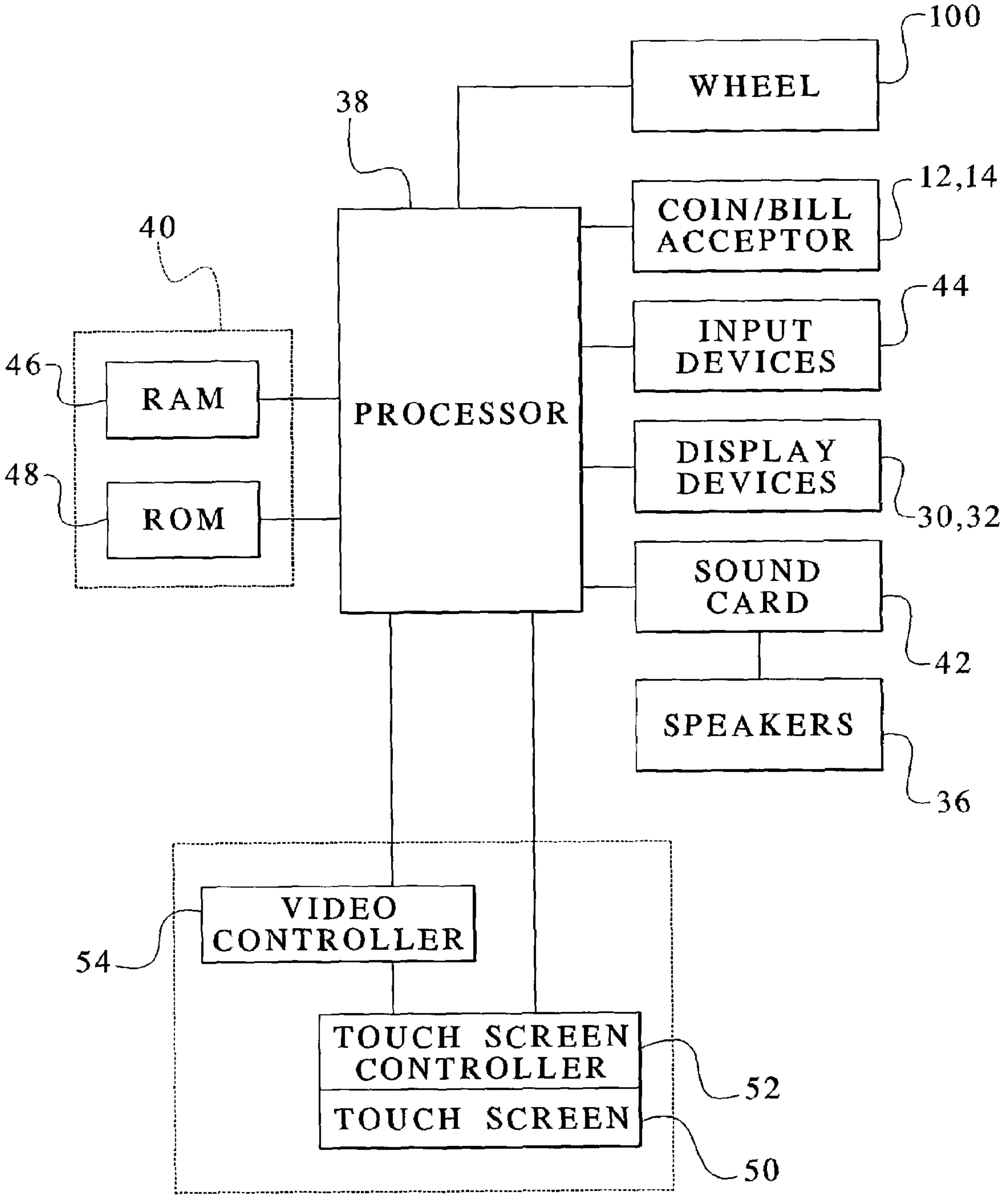
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a mechanical wheel 100; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 17, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 17 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus game. This type of gaming device 10 will include a program which will automatically begins a bonus game when the player has achieved a qualifying condition in the game. This qualifying condition can be a particular arrangement of indicia on a display device. The gaming device 10 may use mechanical devices or a video-based central display device 30 to enable the player to play the bonus game. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

In one embodiment of the present invention, if a player achieves a bonus triggering or qualifying condition during the primary game, the gaming device 10 initiates the secondary or bonus game of the present invention.

Figure 3:
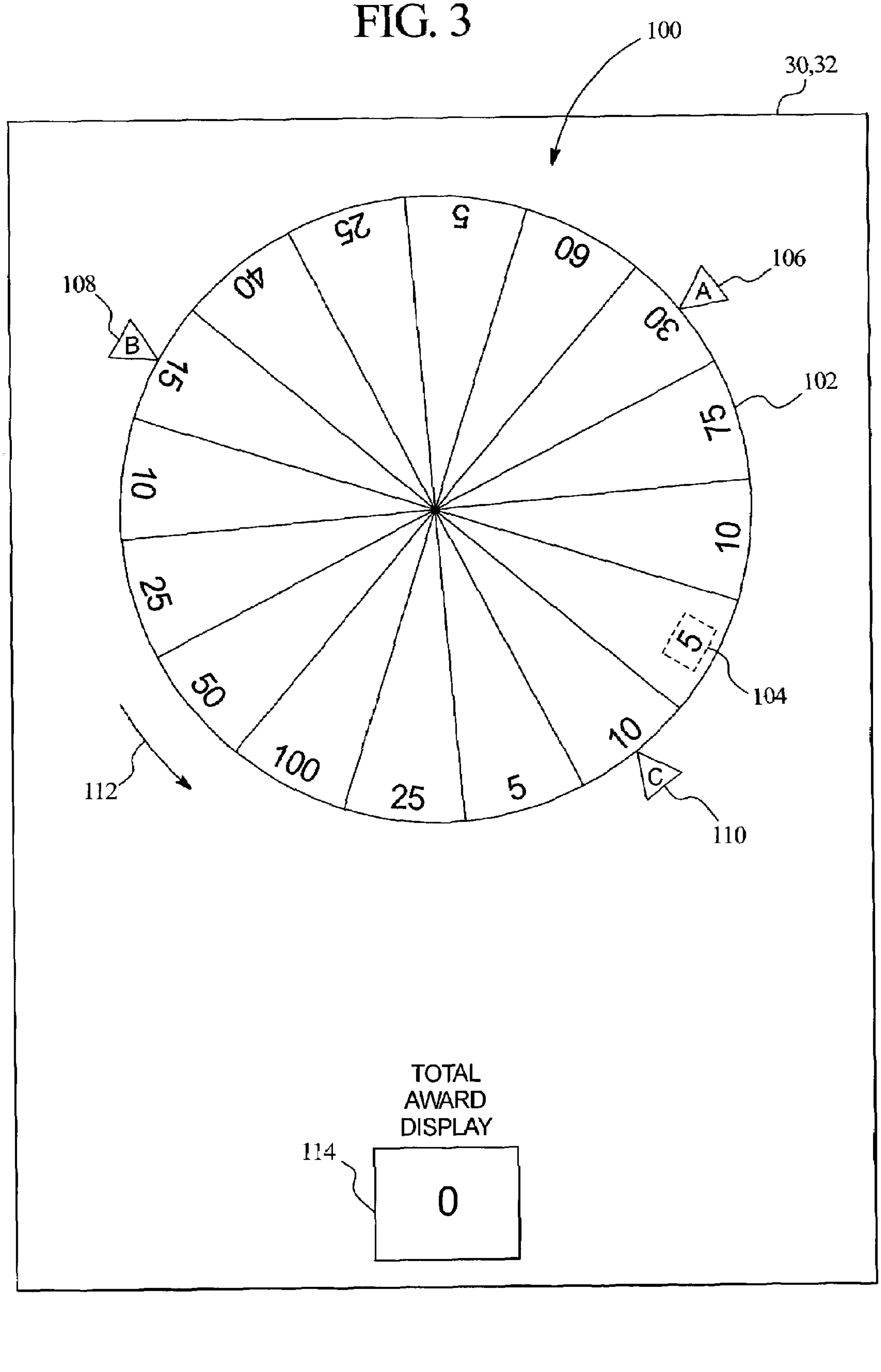
FIG. 3 is an enlarged front elevation view of one of the display devices of FIGS. 1A and 1B illustrating one embodiment of the present invention.

Referring now to FIG. 3, one embodiment of the present invention is illustrated where the bonus game includes a mechanical or video wheel 100 having a plurality of sections 102. An award symbol 104 is associated with each section 102. One or more awards are associated with the award symbols 104. The awards may be any suitable award such as values, credits, free spins, free games, multipliers or award opportunities as desired by the game implementor. The gaming device includes a plurality of award indicators such as section indicators 106, 108 and 110, designated by the letters A, B and C, respectively, which are associated with the wheel 100. It should be appreciated that the indicators 106, 108 and 110 may by designated by colors, characters, numbers, images or any suitable designator. Each section indicator is adapted to indicate one of the sections 102 on the wheel 100. In one embodiment, the wheel rotates in a counter clockwise direction as indicated by arrow 112 in FIG. 3. It should be appreciated, however, that the wheel may rotate in a clockwise direction, a counter clockwise direction, or any combination therein. It should also be appreciated that the wheel may remain stationary and the section indicators may move about the wheel or both the wheel and the section indicators may move in the same direction or different directions. A total award display 114 indicates the total award obtained by the player in the game. The total award displayed in the total award display 114 at the end of the game is the total award provided to the player for the game.

Figure 4:
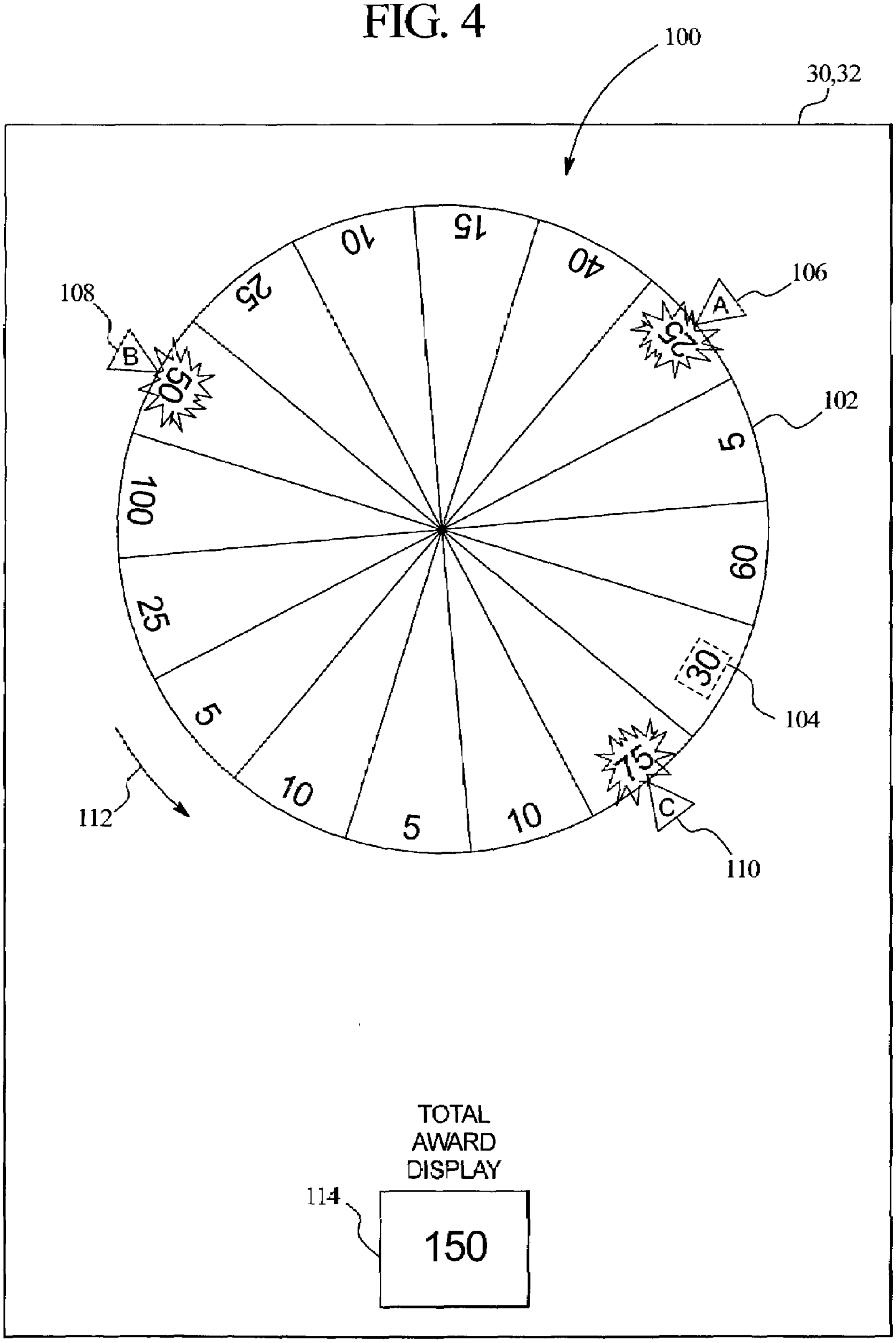
FIG. 4 is an enlarged front elevation view of one of the display devices of FIGS. 1A and 1B illustrating an example of the embodiment of FIG. 3 where three activated section indicators indicate different sections on an award wheel.

Referring to FIG. 4, in one embodiment, the gaming device activates a predetermined number of section indicators at the start of the game. In another embodiment, the gaming device activates a random number of section indicators. In a further embodiment, the player's wager in the base game or primary game determines the number of section indicators that are activated in the game. In FIG. 4, the gaming device activates all three of the section indicators A, B and C, or 106, 108 and 110, respectively which are provided in the game. Each activated section indicator is adapted to indicate a section 102 on the wheel 100. In this embodiment, the player has one spin in the game. The player receives the awards associated with the award symbols indicated by the activated section indicators 106, 108 and 110. It should be appreciated, however, that the gaming device may provide multiple spins in the game.

In FIG. 4, the gaming device activates or spins the wheel 100. When the wheel stops spinning, the activated section indicators 106, 108 and 110 indicate sections on the wheel having awards of twenty-five, fifty and seventy-five, respectively. The awards are added or summed to provide the total award for the game to the player. In this example, the total award indicated by the activated section indicators 106, 108 and 110 is one hundred fifty. The award of one hundred fifty is transferred to the total award display 114 and is provided to the player in the game. It should be appreciated that the awards may be summed, multiplied, or modified in any other suitable manner desired by the game implementor.

Figure 5A:
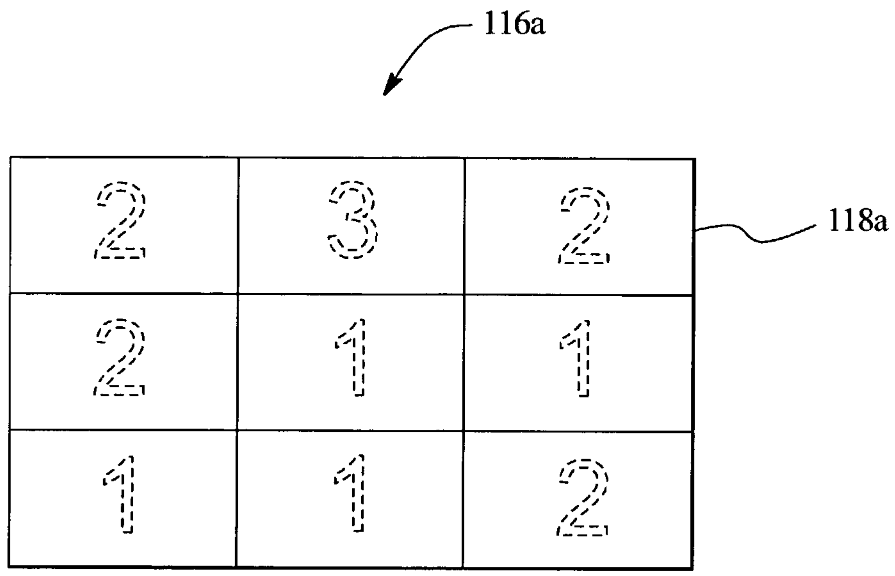
FIGS. 5A and 5B are schematic diagrams illustrating embodiments of the present invention where the number of activated section indicators employed in a game is based on a plurality of selections.
Figure 5B:
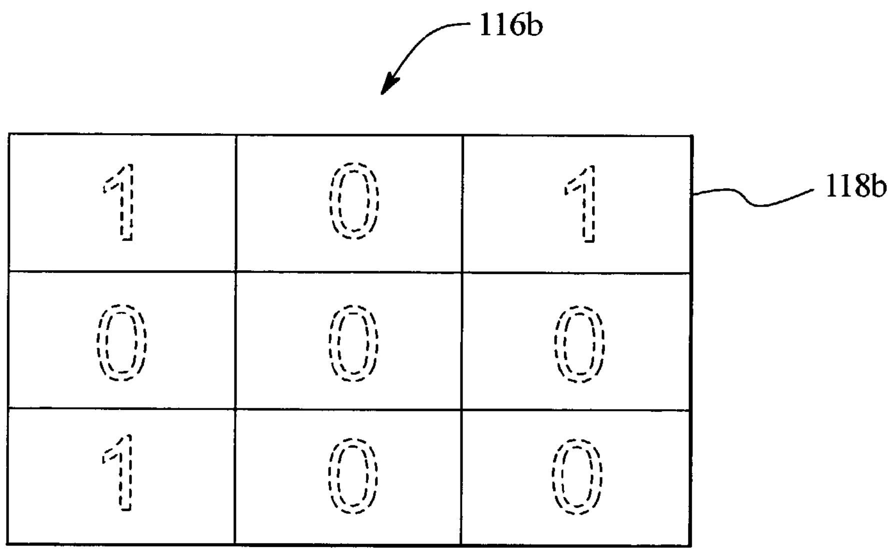

In another embodiment, illustrated in FIGS. 5A and 5B, a plurality of masked selections are displayed to the player prior to or at the start of the game. The gaming device enables the player to pick one or more of the masked or hidden selections to determine and activate a number of section indicators in the bonus game.

Referring to FIG. 5A, the plurality of selections 116*a* include selections 117*a*. Numbers such as integers "1," "2" and "3" are randomly associated with the selections 117*a* and represent the number of activated section indictors in a game. It should be appreciated that the value of the largest integer associated with the selections is equal to or less than the maximum number of section indicators in a game. Initially, the selections 117*a* are masked or hidden from the player. The player is provided with a number of picks from the selections 117*a* to pick a number of section indicators to activate in the game. In one embodiment, the player is provided with one selection from the selections 116*a*. The player may activate “1”, “2” or “3” section indicators as illustrated in FIG. 5A. In one example, the player receives one pick from the plurality of selections 116*a*. If the player picks selection 117*a*, which reveals the number “2,” the gaming device activates two of the section indicators in the game. In another example, if the player picks a selection 117*a*, which reveals the number “3,” the gaming device activates three of the section indicators in the game. It should be appreciated that the gaming device may activate specific section indicators or randomly activate one or more section indicators.

Referring now to FIG. 5B, the plurality of selections 116*b* includes symbols such as numbers “0” and “1”. The player receives a number of picks to pick the selections. When the player picks one of the selections, one of the numbers such as the “0” or “1,” is revealed and displayed to the player. The sum of the numbers associated with the picked selections equals the number of activated section indicators provided to the player in the game. In one embodiment, the sum of the numbers associated with the selections is greater than the number of possible section indicators in the game. In this embodiment, the player has a greater chance of activating the maximum number of section indicators in the game.

In FIG. 5B, the player can activate up to three section indicators in the game. Therefore, the player may obtain “0,” “1,” “2” or “3” activated section indicators in the game after picking one or more of the selections. If the player picks a selection 117*b*, which reveals the number “1,” the gaming device activates one of the section indicators in the game. Subsequently, if the player picks two of the other selections 117*b* where both picked selections reveal the number “1,” the player receives the total or sum of the numbers associated with the picked selections, which is three. Thus, the gaming device activates the maximum number of section indicators (i.e., three) in the game. It should be appreciated that the player may pick and the gaming device may activate any number of section indicators depending on the numbers associated with the selections. It should also be appreciated that a plurality of symbols may be used to represent the numbers of activated section indicators in the selections wherein a player picks a selection having a symbol and receives the number of activated section indicators associated with the picked symbol.

Figure 6:
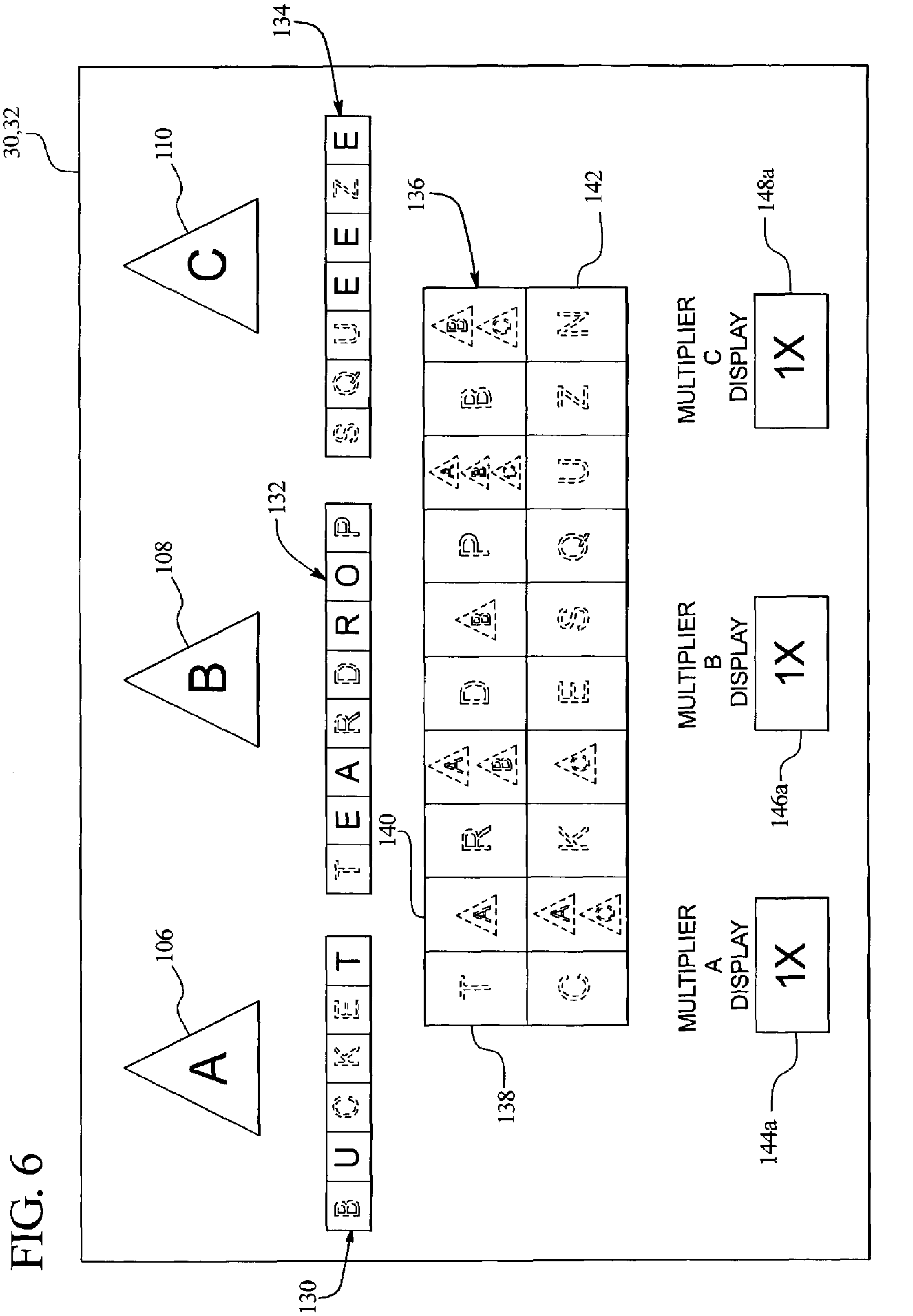
FIG. 6 illustrates another embodiment of the present invention where the number of activated section indicators and associated multipliers are determined in a sub-game.

In another embodiment illustrated in FIG. 6, the number of activated section indicators is determined in a sub-game. In one such sub-game, the gaming device displays a set such as a sequence or sequences 130, 132 and 134 and a plurality of selections 136 to the player. In the illustrated embodiment, each section indicator 106, 108 and 110 has an associated set or sequence 130, 132 and 134, respectively. Each sequence includes symbols such as letters, numbers or any other desired character or symbol. In this embodiment, the symbols are letters which form a word or phrase. The letters in the sequences are initially masked or hidden from the player. In one embodiment, the player picks symbols such as letters to complete one or more of the sequences. The gaming device then activates the section indicator or section indicators associated with the completed sequence or sequences. In this embodiment, the sequences include one or more common symbols where a single pick of the symbols in one of the sequences completes one, two or more of the sequences in the game. Thus, a single pick activates one or more of the section indicators in the game.

The selections include several symbols where some of the symbols are letters such as the letter “T” indicated in selection 138 or the letter “N” indicated in selection 142. The other selections include indicator symbols such as section indicator symbols which activate one or more of the section indicators 106, 108 and 110 in the game. Therefore, one of the selections includes a section indicator symbol which activates the section indicator 106. Another of the selections includes section indicator symbol which activates the section indicator 108, and another selection includes section indicator symbol which activates the section indicator 110. Furthermore, three of the selections include combinations of the section indicator symbols which activate one or more of the section indicators 106, 108 and 110 in the game. In one selection, the section indicator symbols which activate the section indicators 106 and 108 are paired together. In another selection, the section indicator symbols which activate the section indicator symbols 106 and 110 are paired together. In a further selection, section indicator symbols which activate the section indicators 108 and 110 are paired together. In a final selection all three of the section indicator symbols are grouped together. It should be appreciated that the selections 136 are initially masked or hidden from the player so that the player does not know where a particular letter or section indicator symbol is located in the plurality of selections 136. The symbols associated with the selections 136 are revealed to the player when the player picks the selections.

In the sub-game illustrated in FIG. 6, the player picks selections 136 to reveal a matching letter or letters in one or more of the sequences.

In one embodiment, the gaming device includes a symbol or letter selector which enables a player to select one or more of the letters in the sequences. The letter selector may be a set of buttons that correspondence to each of the letters in the sequences or a plurality of selections that include the letters in the sequences as described above.

In another embodiment, some of the letters in each sequence are initially revealed to the player. The player then must attempt to pick selections 136 that reveal the remaining letters in each of the sequences.

In one embodiment, a multiplier is associated with each of the section indicators. The multipliers change in value based on the letters that are revealed in the sequences. A multiplier display is associated with each section indicator. Therefore in FIG. 6, multiplier A display 144*a* is associated with section indicator A (106), multiplier B display 146*a* is associated with section indicator B (108) and multiplier C display 148*a* is associated with section indicator C (110). The multiplier displays 144*a*, 146*a* and 148*a* indicate the value of the multiplier associated with each of the section indicators 106, 108 and 110, respectively, during the sub-game. In one embodiment, the value of the multiplier associated with each section indicator increases by one for each letter picked by the player from the plurality of selections 136 that match one of the letters in the corresponding sequences 130, 132 or 134, respectively. The multipliers may increase by a predetermined or random amount for each matched letter. It should be appreciated that the multipliers may also decrease by any amount or remain unchanged. For example in FIG. 6, if a player picks the selection that reveals the letter “P,” which is associated with sequence 132, the multiplier displayed in the multiplier B display 146*a* increases from “1×” to “2×.” If the player picks another letter from the selections 136 that matches one of the letters in the sequence 132, the multiplier increases by one again to “3×.” In one embodiment, each letter associated with the plurality of selections is associated with one of the sequences 130, 132 and 134. Therefore, in this embodiment, the player can only increase the multiplier associated with one of the section indicators 106, 108 and 110 with each pick. In another embodiment, a letter may be associated with one or more of the sequences. In this embodiment, one of the picked letters may increase the multiplier associated with one or more of the sequences associated with the section indicators.

Additionally, in one embodiment, one or more of the symbols or letters includes an additional award such as a number of free spins of the award indicator, credits, values or any suitable award or values. The gaming device provides the additional award to the player when the player picks the symbol or symbol in the game.

In the sub-game illustrated in FIG. 6, if the player picks a selection 136 that reveals one or more section indicator symbols, the gaming device activates the section indicators associated with those section indicator symbols in the game. For example, if the player picks a selection having section indicator symbols associated with section indicators 106 and 108, then the gaming device activates the section indicators 106 and 108 in the game. The gaming device does not activate section indicator 110 in the game because as of that point in the game, the player did not pick the selection having the section indicator symbol associated with section indicator 110. Similarly, if the player picks the selection including all three section indicator symbols associated with section indicators 106, 108 and 110, then the gaming device activates the maximum number of section indicators in the game, which in this example is three. Once the player picks a selection that reveals one or more section indicator symbols, the gaming device activates the section indicators associated with those symbols and the game initiates. In the game, the gaming device or the player spins the wheel illustrated in FIG. 4, having the number of activated section indicators associated with the section indicator symbols picked by the player. The awards associated with the award symbols on the indicated sections are multiplied by the multipliers associated with the activated section indicators. The multiplied awards are summed or added together and provided to the player at the end of the game.

Referring now to FIGS. 7A to 7D, an example of the embodiment of FIG. 6 is illustrated where the player is provided with a plurality of masked or hidden selections 136. In this example, the multipliers associated with section indicators 106, 108 and 110 are initially at "1×." It should be appreciated that the multipliers may start at any value and may be different values. Also, the sequences 130, 132 and 134 include a plurality of letters which form the words "BUCKET," "TEARDROP" and "SQUEEZE." However, the words may be any words or other symbol combinations desired by the game implementor.

Figure 7A:
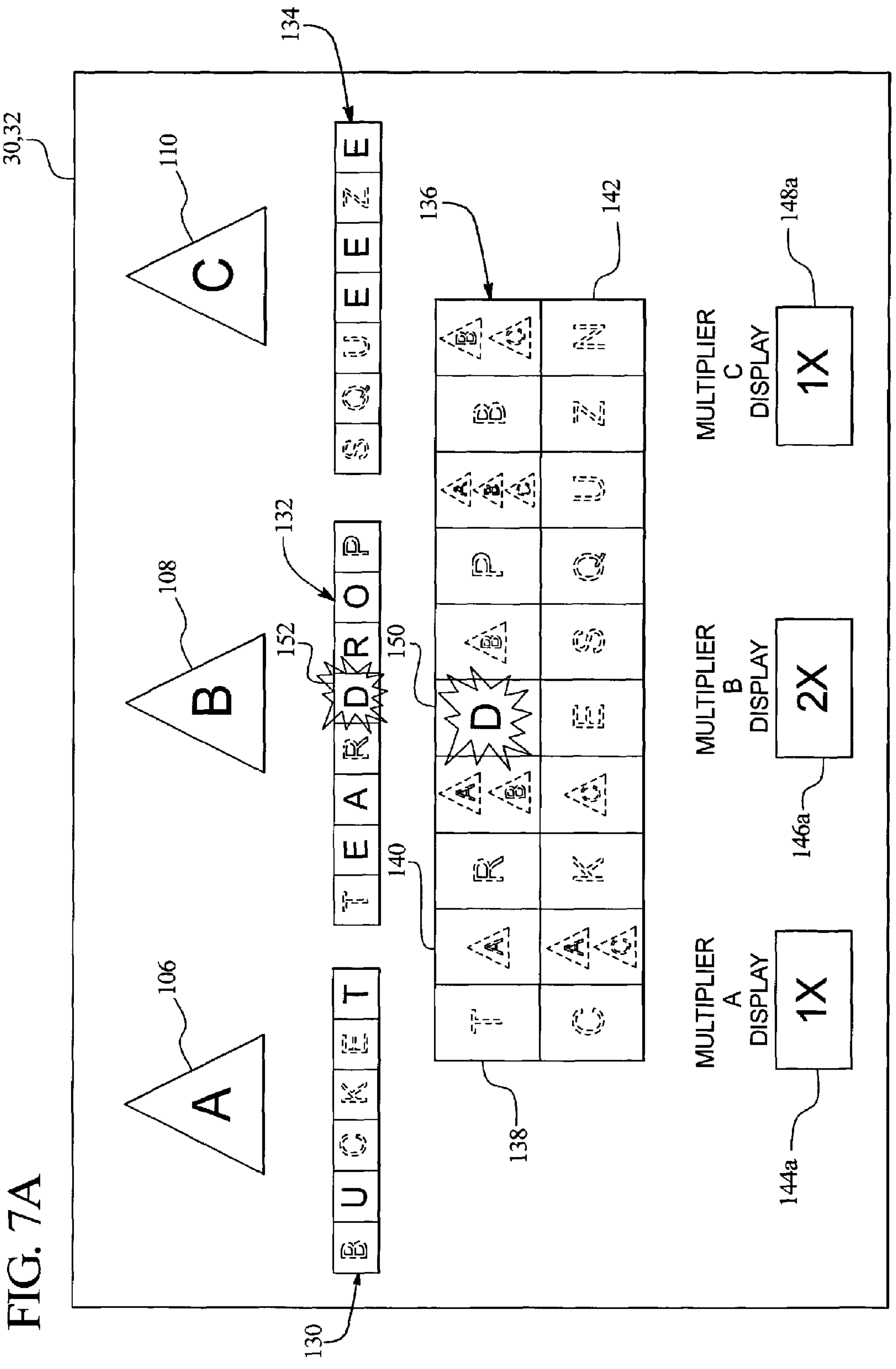
FIGS. 7A to 7C are enlarged front elevation views of one of the display devices of FIGS. 1A and 1B illustrating an example of the embodiment of FIG. 6 where a player picks three selections from the plurality of selections.

In FIG. 7A, the player picks selection 150 from the plurality of selections 136 with their first pick. The selection 150 reveals the letter "D." The letter "D" is only associated with sequence 132. Thus, the letter "D" is revealed in sequence 132 and the multiplier associated with section indicator 108, which is displayed in Multiplier "B" Display 146*a*, is increased by one from "1×" to "2×." The player continues to pick selections from the plurality of selections 136 until the player picks a selection that reveals one or more section indicator symbols.

Figure 7B:
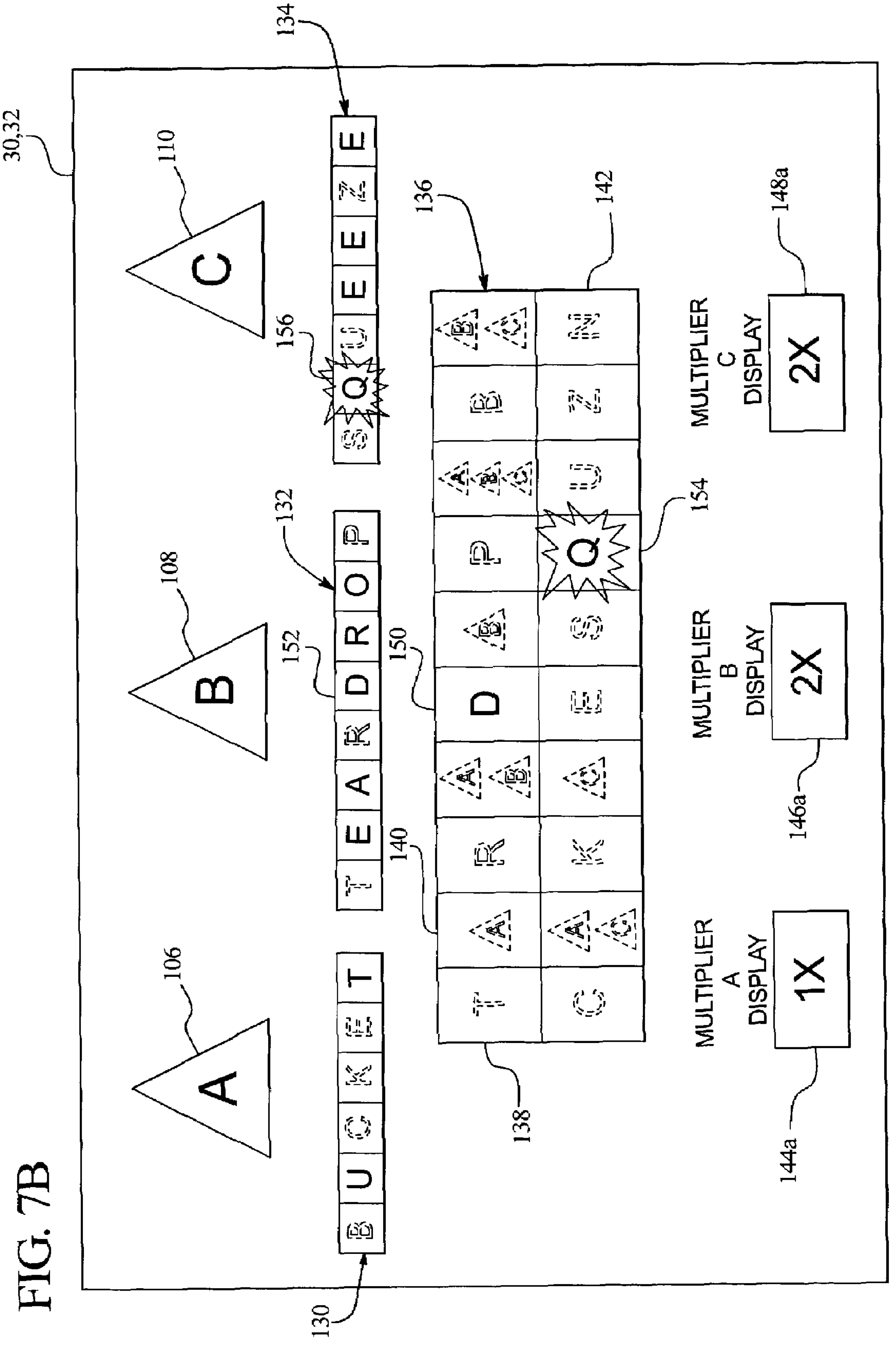

In FIG. 7B, the player picks a second selection from the plurality of selections 136. The player picks selection 154, which reveals the letter "Q." The letter "Q" is associated with sequence 134 and only appears once in that sequence. As a result, the multiplier displayed in Multiplier C Display 148*a*, which is associated with section indicator 110, is increased by one from "1×" to "2×." Since the player did not pick a selection including one or more section indicator symbols, the player continues to pick selections from the plurality of selections 136.

Figure 7C:
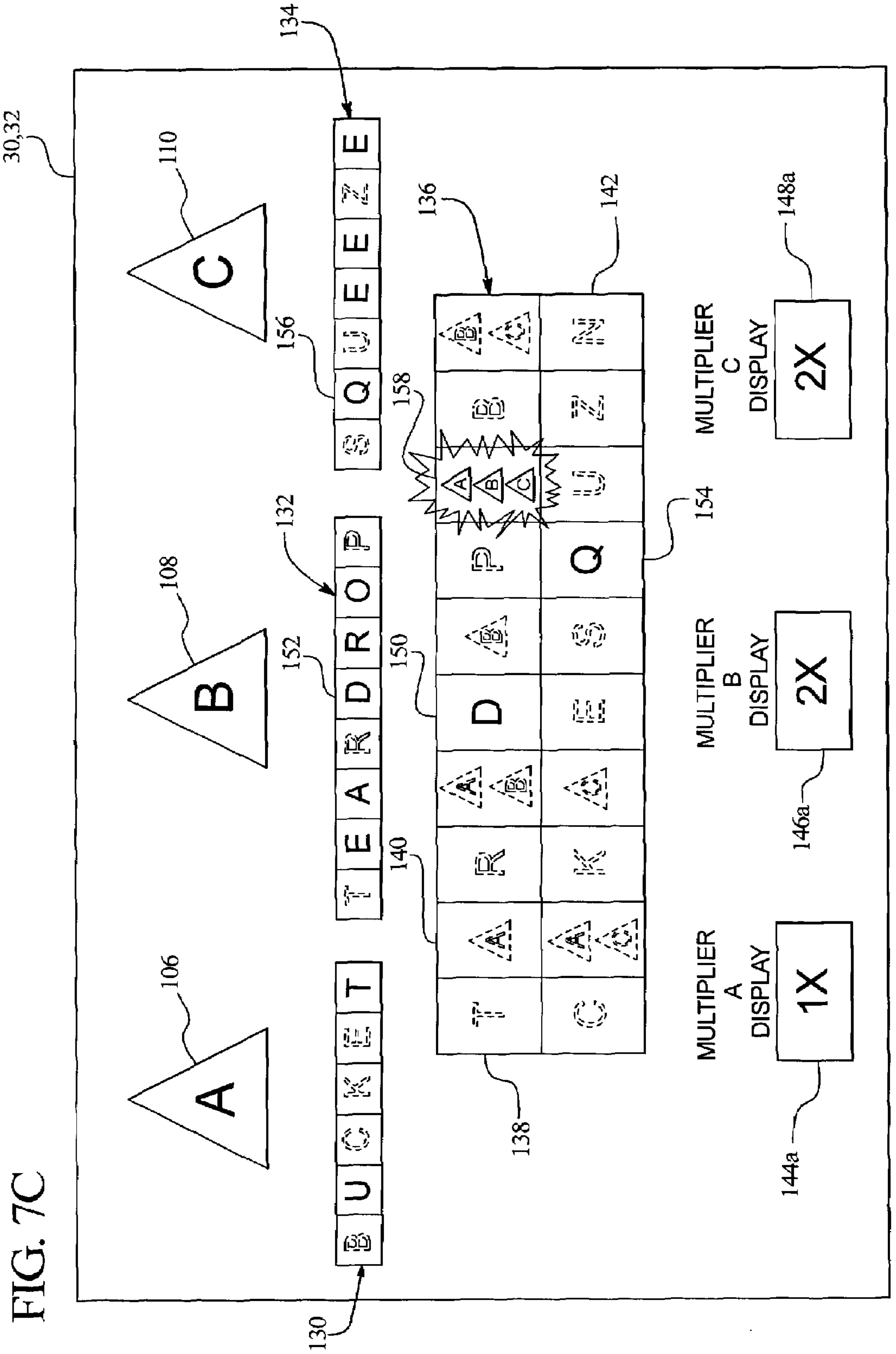

In FIG. 7C, the player picks a third selection, selection 158, from the plurality of selections 136. Selection 158 reveals three section indicator symbols. The section indicator symbols are associated with section indicators 106, 108 and 110. Therefore, the gaming device activates the maximum number of section indicators in the game. In one embodiment, the section indicator symbols are not associated with any additional awards. In another embodiment, each section indicator symbol or all of the section indicator symbols are associated with one or more additional awards, which are provided to the player when the player picks the selection associated with one or more of the section indicator symbols. In this example, the player only obtains the lowest multiplier value (i.e., 1×) for section indicator symbol 106 as indicated by Multiplier A Display 144*a*. However, the player did pick a selection that revealed one letter in the sequences 132 and 134, which are associated with section indicators 108 and 110, respectively. Thus, the player obtained a multiplier of "2×" for section indicators 108 and 110, as indicated by Multiplier B Display 146*a* and Multiplier C Display 148*a*.

In the game, the gaming device activates all three section indicators and provides the player with one spin. The player spins the wheel and receives the awards associated with the sections indicated by the activated section indicators 106, 108 and 110 in that spin. Furthermore, the award associated with each section indicated by the activated section indicators 106, 108 and 110 is multiplied by the multipliers associated with those section indicators as displayed by Multiplier A Display 144*a*, Multiplier B Display 146*a*, and Multiplier C Display 148*a*. Thus, the award indicated by section indicator 106 will be multiplied by "1×" as indicated in the Multiplier A Display 144*a*, the award indicated by indicator 108 will be multiplied by "2×" as indicated in Multiplier B Display 146*a* and the award indicated by section indicator 110 will be multiplied by "2×" as indicated by Multiplier C Display 148*a*.

Figure 7D:
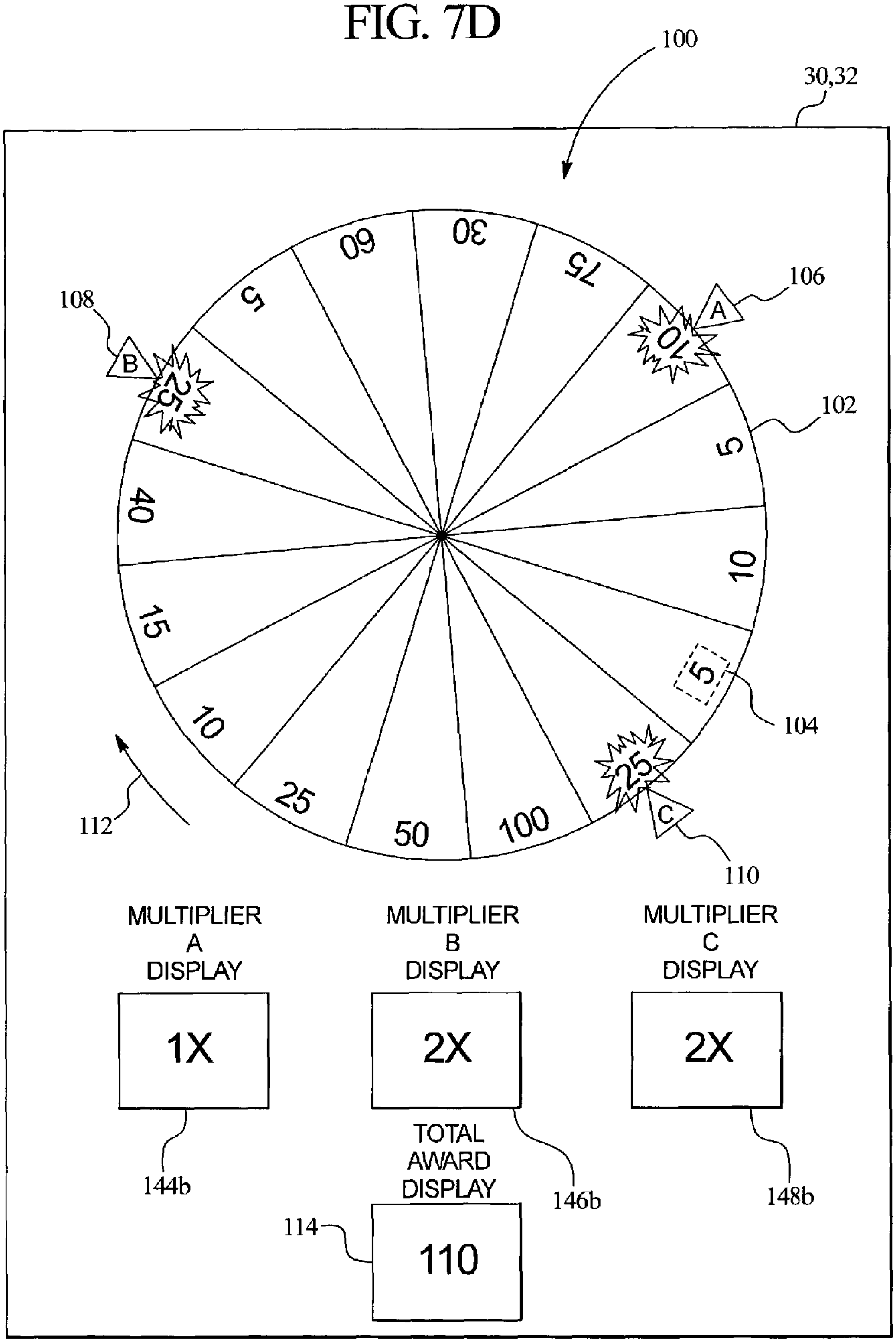
FIG. 7D is an enlarged front elevation view of one of the display devices of FIGS. 1A and 1B illustrating an award wheel where the number of activated section indicators is based on the selections picked by the player in FIGS. 7A to 7C.

Referring now to FIG. 7D, the gaming device initiates the bonus game and displays a wheel 100 having a plurality of sections 102. Several award symbols 104 are associated with sections 102. Because the player obtained all three section indicators 106, 108 and 110 in the sub-game, the gaming device activates all three section indicators, such as by illuminating or highlighting the activated section indicators, to show that all three section indicators are activated for the game. If the player only obtained two of the section indicators in the sub-game, only those two section indicators obtained by the player are activated for the game. The wheel 100 rotates in a clockwise direction as shown by arrow 112. Also, the gaming device displays a multiplier display associated with each section indicator. Multiplier A Display 144*b* is associated with section indicator A (106). Multiplier B Display 146*b* is associated with section indicator B (108). Multiplier C Display 148*b* is associated with section indicator C (110). In addition, a total award display 114 displays or indicates the total award accumulated by the player in the game.

In the game illustrated in FIG. 7D, the gaming device or the player spins the wheel 100. When the wheel stops spinning, the activated section indicators 106, 108 and 110 indicate sections including award symbols with awards of ten, twenty-five and twenty-five, respectively. Thus, the award associated with section indicator 106, which is ten, is multiplied by the multiplier associated with the section indicator 106 and indicated by Multiplier A Display 144*b*, which is "1×." The award indicated by section indicator 108, which is twenty-five, is multiplied by the multiplier associated with the section indicator 108 and indicated in Multiplier B Display 146*b*, which is "2×." The award indicated by section indicator 110, which is twenty-five, is multiplied by the multiplier associated with the section indicator 110 and indicated in Multiplier C Display 148*b*, which is "2×." Thus, the awards indicated by section indicators 106, 108 and 110 are modified or multiplied by the corresponding multipliers to become awards of ten, fifty and fifty, respectively. The awards are added or summed together to provide the total award of one hundred ten as indicated by total award display 114. The player receives the total award of one hundred ten for the game.

In a further embodiment, the present invention is employed as a primary game. In one such primary game, the number of activated section indicators may be determined on a plurality of reels, from a plurality of selections or in any suitable game. In one such primary game, the number of section indicators activated in a subsequent game such as the bonus game are determined by a plurality of reels. The reels include one or more section indicator symbols or activator symbols. The gaming device or the player spins the reels and the gaming device activates the section indicators based on the number of the section indicator symbols that appear on the reels. For example, if two section indicator symbols appear on the reels, the gaming device activates two section indicator symbols in a subsequent game. It should be appreciated that the number of section indicator symbols included on the reels equals or is less than the maximum number of section indicators available in the subsequent game such as the bonus game.

In another embodiment of the above primary game, the section indicator symbols include numbers such as integers which represent a number of section indicators to activate in a subsequent game. For example, the section indicators may include the numbers "1", "2" and "3". The gaming device or player spins the reels and the gaming device activates the number of section indicators associated with the section indicator symbol having the greatest number associated with it which appears on the reels. In a further aspect of this embodiment, a plurality of selections are displayed to the player in the primary game and the player picks selections as described above to obtain a number of activated section indicators in a subsequent game. It should be appreciated that any suitable number of section indicators may be activated in a game where the number of activated section indicators is equal to or less than the number associated with the section indicator symbol or symbols that occur on the reels.

In another embodiment, each of the section indicators in a game are associated with a specific combination of symbols on the reels. The gaming device spins the reels and activates one or more of the section indicators when the specific combination or combinations of symbols associated with the section indicators are indicated on the reels. For example, a game includes two section indicators designated by the letters A and B. Section indicator A is activated when two A symbols occur on the reels. Section indicator B is activated when three B symbols appear on the reels. The gaming device spins the reels and two A symbols are indicated or occur on the reels. Thus, the gaming device activates section indicator A in the game.

In a further aspect of this embodiment, the section indicators include different colors such as red, blue and green. It should be appreciated that the section indicators may include any suitable color or combination of colors in a game. It should also be appreciated that the section indicators may be designated by colors, numbers, characters, symbols, images or any suitable designator. In this embodiment, each section indicator includes a different color and the reels include activator symbols including each of the different colors. Thus, one or more of the section indicators are activated when one or more of the colors or activator symbols including the colors corresponding to the section indicators are indicated on the reels as described above. It should be appreciated that the section indicators may be activated based on a combination of one or more symbols including the same color or different colors in a game.

In a further embodiment, the reels include a plurality of symbols and are designated by one or more colors corresponding to the colors associated with each of the section indicators in a game. In this embodiment, the gaming device activates a section indicator when one or more activator symbols occur on the reel including the color associated with the section indicator. For example, the section indicator including the color red is activated when one or more designated activator symbols occur on the reel including the color red. It should be appreciated that one or more reels may be employed in a game and the reels may include one or more colors or color combinations as desired by the game implementor.

In another embodiment, one or more puzzles are associated with the section indicators. The gaming device enables a player to solve or complete the puzzle or puzzles to activate one or more of the section indicators. In one aspect of this embodiment, one puzzle is associated with each of the section indicators in a game. The gaming device activates one or more of the section indicators when the player solves or completes the puzzle or puzzles associated with those section indicators. In another aspect of this embodiment, a single puzzle including one or more components is associated with all of the section indicators in a game. Specifically, one or more of the components in the puzzle are associated with each of the section indicators. Therefore, the gaming device activates the section indicators based on the specific component or components that are solved or completed by the player in the puzzle.

In a further embodiment, the sequences described above are employed in a persistence game. In this embodiment, the gaming device enables the player to pick symbols in one or more of the sequences in the game to activate at least one of the section indicators in the game. Any symbols picked by the player remain displayed or indicated in the sequences for a designated number of games. Therefore, a player may complete a sequence in a single game or in a plurality of games. Similarly, one player may initially reveal some of the symbols in the sequences in one game and a subsequent player or players may complete or solve one or more of the sequences in a subsequent game or games. It should be appreciated that the designated number of games may be randomly determined, predetermined, determined based on a wager by a player or according to any suitable determination method. It should also be appreciated that the picked symbols in the sequences may remain revealed or displayed to the players until one or more of the sequences are completed.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming system comprising:

at least one input device;

at least one display device; and at least one processor programmed to operate with the at least one input device and the at least one display device to:

(a) for each of a plurality of selections, randomly choose one of a plurality of different numbers of a plurality of activatable symbol indicators to associate with said selection, wherein the plurality of different numbers include: zero and a plurality of different numbers greater than zero;

(b) enable a player to pick at least one of the selections to determine a quantity from a plurality of different quantities of the plurality of activatable symbol indicators which are active;

(c) after said determination of the quantity of the plurality of activatable symbol indicators which are active, cause at least one of the plurality of activatable symbol indicators to indicate an award symbol on an award indicator including a plurality of award symbols, wherein the award symbol indicated by each of the at least one activatable symbol indicators is associated with an award which is not provided to the player and then cause said active symbol indicators to indicate award symbols on the award indicator, wherein the award symbols indicated by the active symbol indicators are each associated with a total award which is provided to the player; and (d) provide the total award to the player based on the awards associated with the award symbols indicated by the active symbol indicators.

2. The gaming device of claim 1, wherein a plurality of the selections are associated with a number of activatable symbol indicators which is greater than one.

3. The gaming device of claim 1, wherein a plurality of the selections are associated with one activatable symbol indicator.

4. The gaming device of claim 1, wherein the selections include a plurality of symbols, each of said symbols representing a number of activatable symbol indicators.

5. The gaming device of claim 1, which includes a multiplier associated with each of the activatable symbol indicators.

6. The gaming device of claim 1, which includes a multiplier associated with all of the activatable symbol indicators.

7. The gaming device of claim 6, wherein the total award is based on the awards associated with the award symbols indicated by the activated symbol indicators multiplied by the multipliers associated with said activated symbol indicators.

8. The gaming device of claim 1, wherein the award indicator is a wheel including a plurality of sections, said sections including the award symbols.

9. The gaming device of claim 1, wherein the selections include a plurality of different colors, and wherein, at least one of said colors is associated with each of the symbol indicators.

10. The gaming device of claim 1, wherein the at least one processor is programmed to randomly determine which symbol indicators are active.

11. The gaming device of claim 1, wherein the determined quantity of active symbol indicators is based on a wager amount.

12. A gaming system comprising:

at least one input device;

at least one display device; and at least one processor programmed to operate with the at least one input device and the at least one display device to:

(a) for each of a plurality of selections, randomly choose one of a plurality of different numbers of a plurality of activatable symbol indicators to associate with said selection, wherein the plurality of different numbers include zero and a plurality of different numbers greater than zero;

(b) enable a player to pick at least one of the selections to determine a quantity from a plurality of different quantities of the plurality of activatable symbol indicators which are active, wherein at least two of the plurality of activatable symbol indicators are associated with a multiplier;

(c) after said determination of the quantity of the plurality of activatable symbol indicators which are active, cause at least one of the plurality of activatable symbol indicators to indicate an award symbol on an award indicator including a plurality of award symbols, wherein the award symbol indicated by each of the at least one activatable symbol indicators is associated with an award which is not provided to the player and then cause said active symbol indicators to indicate award symbols on the award indicator, wherein said award symbols indicated by the active symbol indicators are each associated with a total award which is provided to the player; and (d) provide the total award to the player based on the awards associated with the award symbols indicated by the active symbol indicators and any multipliers associated with the active symbol indicators.

13. The gaming device of claim 12, wherein a plurality of the selections are associated with a numbers of activatable symbol indicators which is greater than one.

14. The gaming device of claim 12, wherein plurality of the selections are associated with one activatable symbol indicators.

15. The gaming device of claim 12, wherein the selections include a plurality of symbols, each of said symbols representing a number of activatable symbol indicators.

16. The gaming device of claim 12, wherein each of the activatable symbol indicators is associated with a different multiplier.

17. The gaming device of claim 12, wherein the total award is based on the awards associated with the award symbols indicated by the activated symbol indicators multiplied by the multipliers associated with said activated symbol indicators.

18. The gaming device of claim 12, wherein the award indicator is a wheel including a plurality of sections, said sections including the award symbols.

19. The gaming device of claim 12, wherein the selections include a plurality of different colors, and wherein, at least one of said colors is associated with each of the symbol indicators.

20. The gaming device of claim 12, wherein the at least one processor is programmed to randomly determine which symbol indicators are active.

21. The gaming device of claim 12, wherein the determined quantity of active symbol indicators is based on a wager amount.

22. A gaming system comprising:

at least one input device;

at least one display device; and at least one processor programmed to operate with the at least one input device and the at least one display device to:

(a) for each of a plurality of selections, randomly choose one of a plurality of different numbers of a plurality of activatable symbol indicators to associate with said selection, wherein at least two of the numbers associated with the selections are different;

(b) enable a player to pick at least one of the selections to determine a quantity from a plurality of different quantities of the plurality of activatable symbol indicators which are to be activated;

(c) after said determination of the quantity of the plurality of activatable symbol indicators which are to be activated, randomly determine which of the plurality of activatable symbol indicators to activate;

(d) cause at least one of the plurality of activatable symbol indicators to indicate an award symbol on an award indicator including a plurality of award symbols, wherein the award symbol indicated by each of the at least one activatable symbol indicators is associated with an award which is not provided to the player and then cause said activated symbol indicators to indicate award symbols on the award indicator, wherein the award symbols indicated by the activated symbol indicators are each associated with a total award which is provided to the player; and (e) provide the total award to the player based on the awards associated with the award symbols indicated by the active symbol indicators.

23. The gaming device of claim 22, wherein a plurality of the selections are associated with a number of activatable symbol indicators which is greater than one.

24. The gaming device of claim 22, wherein a plurality of the selections are associated with one activatable symbol indicator.

25. The gaming device of claim 22, wherein the selections include a plurality of symbols, each of said symbols representing a number of activatable symbol indicators.

26. The gaming device of claim 22, which includes a multiplier associated with each of the activatable symbol indicators.

27. The gaming device of claim 22, which includes a multiplier associated with all of the activatable symbol indicators.

28. The gaming device of claim 27, wherein the total award is based on the awards associated with the award symbols indicated by the activated symbol indicators multiplied by the multipliers associated with said activated symbol indicators.

29. The gaming device of claim 22, wherein the award indicator is a wheel including a plurality of sections, said sections including the award symbols.

30. The gaming device of claim 22, wherein the selections include a plurality of different colors, and wherein, at least one of said colors is associated with each of the symbol indicators.

* * * * *

UNITED STATES PATENT AND TRADEMARK OFFICE

CERTIFICATE OF CORRECTION

PATENT NO. : 7,431,649 B2 
APPLICATION NO. : 10/243459
DATED : October 7, 2008
INVENTOR(S) : Bayard S. Webb et al.

It is certified that error appears in the above-identified patent and that said Letters Patent is hereby corrected as shown below:

IN THE CLAIMS:

In Claim 1, Column 15, Line 8 change “includes: zero” to --includes zero--.

In Claim 13, Column 16, Line 31 change “numbers” to --number--.

In Claim 14, Column 16, Line 33 change “wherein plurality” to --wherein a plurality--.

Signed and Sealed this

Twenty-third Day of December, 2008

Jon W. Dudas

JON W. DUDAS
*Director of the United States Patent and Trademark Office*